(12) United States Patent
Ortiz Egea et al.

(10) Patent No.: US 12,175,635 B2
(45) Date of Patent: Dec. 24, 2024

(54) TEMPORAL METRICS FOR DENOISING DEPTH IMAGE DATA

(71) Applicant: Microsoft Technology Licensing, LLC, Redmond, WA (US)

(72) Inventors: Sergio Ortiz Egea, San Jose, CA (US); Augustine Cha, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 584 days.

(21) Appl. No.: 17/445,823

(22) Filed: Aug. 24, 2021

(65) Prior Publication Data

US 2023/0072179 A1   Mar. 9, 2023

(51) Int. Cl.
*G06T 5/70* (2024.01)
*G06T 7/13* (2017.01)

(52) U.S. Cl.
CPC .............. *G06T 5/70* (2024.01); *G06T 7/13* (2017.01); *G06T 2207/10028* (2013.01); *G06T 2207/20076* (2013.01); *G06T 2207/20182* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 10,215,856 B1 | 2/2019 | Xu | |
| 10,607,352 B2 * | 3/2020 | Ortiz Egea | H04N 5/33 |
| 10,902,623 B1 | 1/2021 | Li et al. | |
| 2015/0253429 A1 | 9/2015 | Dorrington et al. | |
| 2016/0314613 A1 | 10/2016 | Nowozin et al. | |
| 2017/0064235 A1 | 3/2017 | Wang et al. | |
| 2020/0050833 A1 * | 2/2020 | Ogasawara | G06V 10/60 |
| 2020/0177870 A1 | 6/2020 | Tadi et al. | |
| 2021/0088636 A1 | 3/2021 | Xu et al. | |
| 2022/0383455 A1 * | 12/2022 | Ortiz Egea | G06T 5/92 |

(Continued)

OTHER PUBLICATIONS

Gutierrez-Barragan, et al., "iToF2dToF: A Robust and Flexible Representation for Data-Driven Time-of-Flight Imaging", In Repository of arXiv:2103.07087v2, May 10, 2021, pp. 1-24.

(Continued)

*Primary Examiner* — Randolph I Chu
(74) *Attorney, Agent, or Firm* — Alleman Hall & Tuttle LLP

(57) ABSTRACT

Examples are disclosed relating to performing signal processing on time-of-flight sensor data using pixelwise temporal metrics. One example provides a computing system comprising a logic machine, and a storage machine holding instructions executable by the logic machine to obtain temporal phase data for a plurality of pixels as acquired by a time-of-flight image sensor, the temporal phase data comprising phase data for a plurality of light modulation frequencies, determine temporal active brightness data for the pixel, and, for each pixel of the plurality of pixels, determine a statistical metric for the temporal active brightness data. The instructions are further executable to perform phase unwrapping on the temporal phase data for the plurality of pixels to obtain a depth image, based on the statistical metric for the temporal active brightness data, perform a denoising operation on at least some pixels of the depth image, and output the depth image.

20 Claims, 13 Drawing Sheets

(56) References Cited

U.S. PATENT DOCUMENTS

| | | | |
|---|---|---|---|
| 2023/0074482 A1* | 3/2023 | Ortiz Egea | G01S 17/894 |
| 2023/0081137 A1* | 3/2023 | Ortiz Egea | G06T 5/70 |
| | | | 382/173 |
| 2023/0134806 A1* | 5/2023 | Mallaiyan | G06T 7/13 |
| | | | 382/275 |
| 2023/0291886 A1* | 9/2023 | Zhu | H04N 13/268 |

OTHER PUBLICATIONS

Crabb, Ryane, "Fast Time-of-Flight Phase Unwrapping and Scene Segmentation Using Data Driven Scene Priors", Retrieved From: https://escholarship.org/content/qt7x91194f/qt7x91194f.pdf, Jan. 1, 2015, 146 Pages.

"International Search Report and Written Opinion Issued in PCT Application No. PCT/US22/035628", Mailed Date: Nov. 23, 2022, 12 Pages.

Wang, et al., "Phase Unwrapping for Time-of-Flight Sensor Based on Image Segmentation", In Journal of IEEE Sensors, vol. 21, Issue 19, Jul. 30, 2021, pp. 21600-21611.

\* cited by examiner

INDEX OF DISPERSION WITH SPATIAL FILTER

METRIC

AB

SEGMENTED

TEMPORAL METRICS FOR DENOISING DEPTH IMAGE DATA

BACKGROUND

Depth sensing systems, such as time-of-flight (ToF) cameras, may be used to produce a depth image of an environment, with each pixel of the depth image representing a distance to a corresponding point in the environment. At each pixel, the distance to a surface is determined based on a round-trip time interval for light emitted at the ToF camera to reflect from the surface and return to a ToF image sensor of the camera.

SUMMARY

Examples are disclosed relating to performing signal processing on time-of-flight sensor data using pixelwise temporal metrics. One example provides a computing system comprising a logic machine, and a storage machine holding instructions executable by the logic machine to obtain temporal phase data for a plurality of pixels as acquired by a time-of-flight (ToF) image sensor, the temporal phase data comprising phase data for a plurality of light modulation frequencies, determine temporal active brightness data for the pixel, and, for each pixel of the plurality of pixels, determine a statistical metric for the temporal active brightness data. The instructions are further executable to perform phase unwrapping on the temporal phase data for the plurality of pixels to obtain a depth image, based on the statistical metric for the temporal active brightness data, perform a denoising operation on at least some pixels of the depth image, and output the depth image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
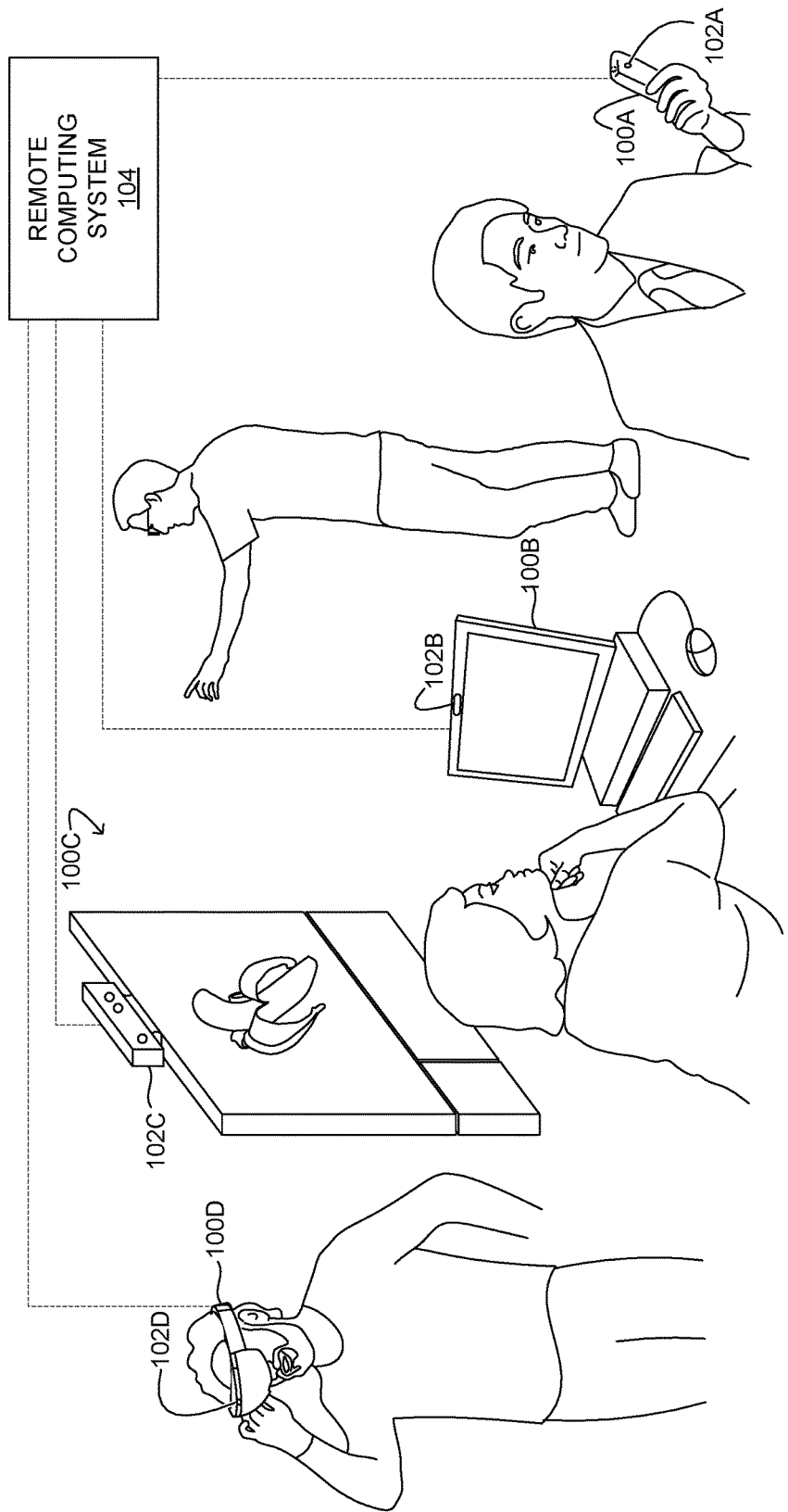
FIGS. 1A-1B show example electronic devices comprising time-of-flight (ToF) cameras.

As mentioned above, time-of-flight (ToF) depth cameras measure, for each sensor pixel of a depth image sensor, a length of a time interval for light emitted by the depth camera to return back to the sensor pixel. As reflectivity may vary across objects in a scene, some pixels may sense signals with low signal to noise ratios in some instances. Further, depth image sensor pixels may be sensitive to various types of signal contamination, such as crosstalk errors and multipath interference. Crosstalk errors occur when photoelectrons captured at one pixel diffuse toward and are collected at neighboring pixels. In multipath interference, light emitted by the depth camera may indirectly scatter in various directions. In some environments, particularly scenes with concave geometries, the scattered light may be incident on a surface imaged by a sensor pixel and contaminate the directly reflected light signal for that pixel. Low reflectivity, signal contamination, and/or other sources of noise may lead to poor depth estimates and unsatisfactory depth images.

In view of such issues, denoising is commonly performed by a ToF depth camera on raw depth image data prior to performing other data processing, such as phase unwrapping that is used in phase-based ToF imaging. Phase-based ToF imaging is a variant of ToF imaging in which depth is computed based on the phase shift of amplitude modulated light reflected back from a subject. In phase-based ToF imaging, a light source on the ToF camera illuminates a scene with amplitude modulated light. The phase shift in the light reflected back from the subject is proportional to the subject's distance modulo the wavelength of the modulation frequency. However, due to the periodic nature of the modulated light, the measured total phase repeats (or wraps) every $2\pi$. Since the number of phase wrappings cannot be directly measured via a phase based ToF pixel, the total phase, and thus the actual distance related to the measurement, is ambiguous. To address this issue, two or more different modulation frequencies can be used to increase the range of unambiguity, allowing the phase information to be "unwrapped" for the accurate determination of distance. Phase unwrapping is a way to disambiguate the phase shift data by illuminating the scene with amplitude-modulated light of a plurality of different frequencies, as the distance ambiguities are different for each frequency of illumination light.

Noise and signal contamination can lead to incorrect unwrapping, and thus relatively large errors in a determined distance at a pixel. As such, depth engine pipelines (processing pipelines used to process depth image data) commonly include procedures to denoise the data prior to performing phase unwrapping. For example, a depth sensor may perform multi-frequency phase collection to obtain noisy data for a plurality of modulation frequencies. Then, the noisy data is processed via signal calibration correction and denoising. Denoising processes generally utilize convolutions that apply a m×n kernel of pixels around a pixel being denoised, and thus are computationally expensive compared to pixelwise operations. After denoising, the total phase can be calculated from the complex signal, followed by phase unwrapping and crosstalk correction. Additionally, an intensity image can be obtained from the denoised data via active brightness averaging. The final depth and, in some examples, intensity images are then output, e.g., for use in gesture identification, AR applications, and/or other uses.

Various denoising operations may be utilized, such as multipath corrections, crosstalk corrections, smoothing operations, and/or jitter reduction. In some approaches, these denoising operations may be applied over all depth data. However, applying denoising filters to all pixels may be computationally expensive. Additionally, multipath corrections may reduce signal to noise ratios, potentially affecting accuracy of depth estimates. Thus, it may be advantageous to perform denoising on pixels in problem areas of depth image data and allocate relatively fewer denoising resources towards other pixels. However, it may be challenging to identify which pixels to correct and which type of denoising filter to apply. For example, multipath interference can occur for pixels that are otherwise high signal. As such, approaches that identify low signal to noise ratios may fail to identify pixels with multipath interference errors. The challenges associated with identifying and correcting multipath interference may lead to stability and performance issues.

Accordingly, examples are disclosed for using pixelwise temporal metrics in the processing of depth data. A pixelwise temporal metric is a statistical metric that is calculated at each pixel based on temporal data for the pixel. Briefly, each ToF depth sensor pixel makes a plurality of measurements at each amplitude modulation frequency, and computes phase data for each amplitude modulation frequency. As the phase data for each amplitude modulation frequency is acquired at different times, the set of phase data for all amplitude modulation frequencies for a pixel has temporal information, and is referred to herein as temporal phase data. The temporal phase data is used to compute temporal active brightness data, which is active brightness data for each amplitude modulation frequency. Then, at each pixel, a statistical metric is determined based on the temporal active brightness data for the pixel. In one example, the statistical metric comprises a coefficient of variation in active brightness, which is described in more detail below along with other example metrics. Once the statistical metric is obtained, further data processing (e.g., segmentation, denoising, crosstalk correction, etc.) can be performed on the depth data based on the metric. For example, depth image data can be segmented based on the statistical metric and then a denoising filter can be selectively applied to a segmented region.

Determining temporal statistical metrics using pixelwise operations avoids expensive operations utilizing relatively large kernel sizes used to determine spatial noise metrics. Further, problem pixels may exhibit relatively high temporal variance, such as low signal, noisy pixels or high signal pixels affected by multipath interference. Thus, a pixelwise temporal metric may allow for efficient, reliable determination of ToF pixels with relatively high variance for segmentation. Reliable segmentation may provide for more efficient allocation of computing resources for denoising operations. More particularly, determining where to apply multipath corrections may improve stability and increase overall performance of the depth engine pipeline compared to current denoising methods.

Despite the application of current methods of denoising depth data, some phase unwrappings may still give inaccurate results and produce so-called "flying pixels" in a depth image. A flying pixel is an erroneous estimate depth value with some threshold difference (e.g., greater than 300 mm or other suitable threshold) from a ground truth depth value. Flying pixels can arise due to noise, sometimes in combination with spatial smoothing algorithms applied close to depth discontinuities. Some approaches may use a confidence threshold and/or an average active brightness filter to identify flying pixels. When flying pixels are detected, they may be corrected, if possible, or invalidated. An invalidated pixel is one that is removed from the depth image prior to sending the depth image (which also may be referred to as a point cloud) to other user services. However, in some cases, such as low active brightness situations, using a confidence threshold may be insufficient for identifying and mitigating flying pixels.

Accordingly, examples are also disclosed related to using pixelwise temporal metrics to identify possible instances of flying pixels. By making a comparison between the above-mentioned statistical metric and a threshold value, a possible flying pixel may be identified. As described in more detail below, in some examples, the statistical metric is used in combination with a confidence threshold to identify instances of flying pixels. Use of pixelwise temporal metrics may help predict and mitigate unwrapping errors in a variety of ambient light conditions.

Figure 1B:
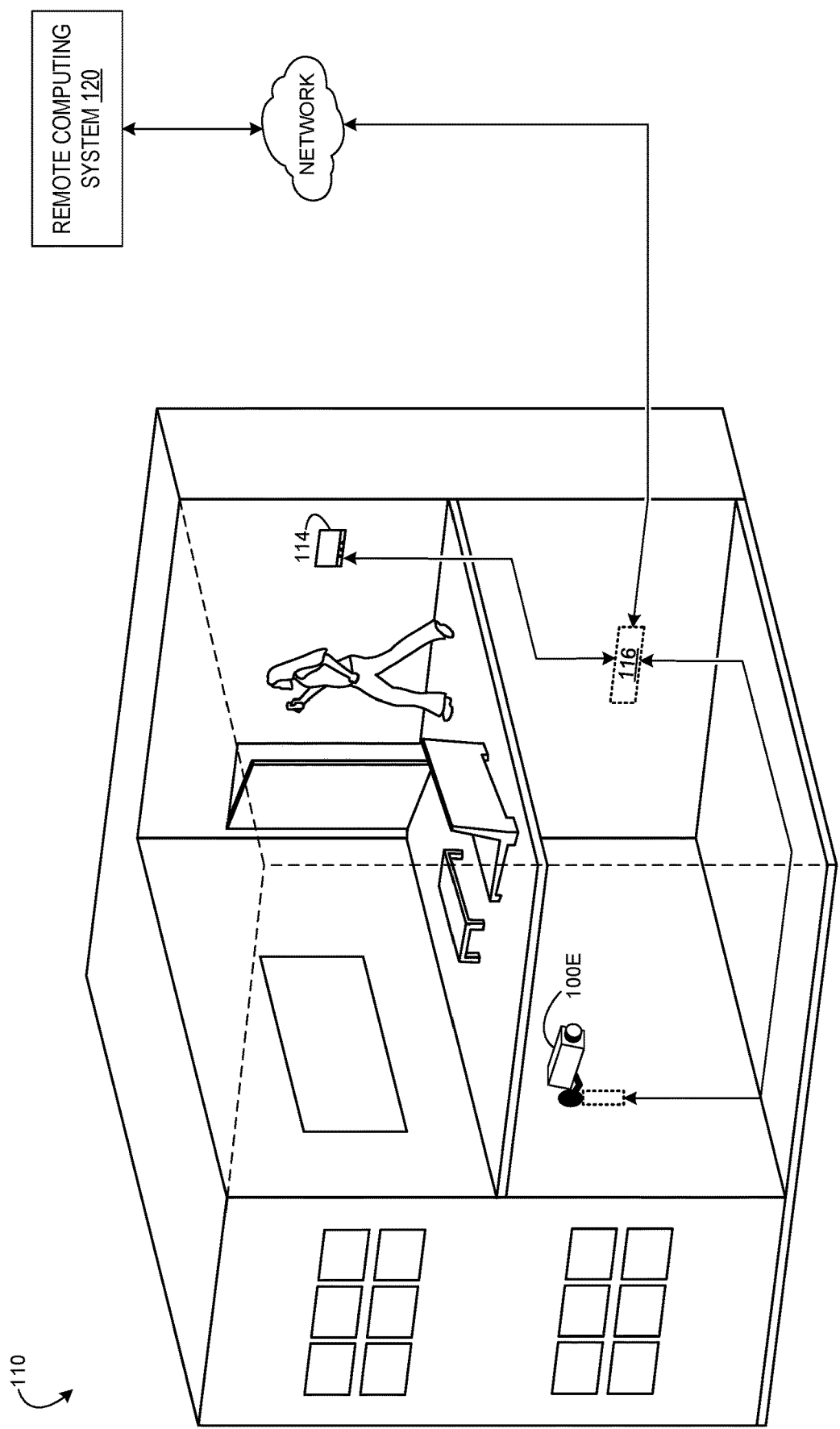

Prior to discussing these examples in detail, FIGS. 1A-1B illustrate various different example electronic devices 100A-E that may employ phase-based ToF depth ToF cameras. Referring first to FIG. 1A, device 100A is a smartphone that includes a ToF camera 102A. Device 100B is a personal computer that includes a ToF web camera 102B. Device 100C is a video game system that includes a peripheral camera system comprising a ToF camera 102C. Device 100D is a virtual-reality headset that includes a camera system comprising a ToF camera 102D. Each device may implement an embedded (also referred to as "monolithic") depth engine pipeline. In other examples, each device may communicate with a remote computing system 104 to implement a distributed depth pipeline according to the disclosed examples. Remote computing system 104 may comprise any suitable computing system, such as a cloud computing system, a PC, a laptop, a phone, a tablet, etc.

FIG. 1B shows an example use environment 110 including a security camera 100E comprising a ToF camera. Security camera 100E sends data to a remote computing system 120 via a communication hub 116. Remote computing system 120 may comprise any suitable computing system, e.g., an internet-of-things (IoT) endpoint device, a cloud computing system, an enterprise system, a networked PC, or a virtual machine implemented on a cloud computing system. Communication hub 116 also connects to other IoT devices, such as a thermostat 114. In combination with communication hub 116 and/or remote computing system 120, security camera 100E may process depth image data by denoising low-signal pixels within a distributed depth engine pipeline. In other examples, security camera 100E and/or communication hub 116 may process depth data via an embedded depth engine pipeline.

Figure 2:
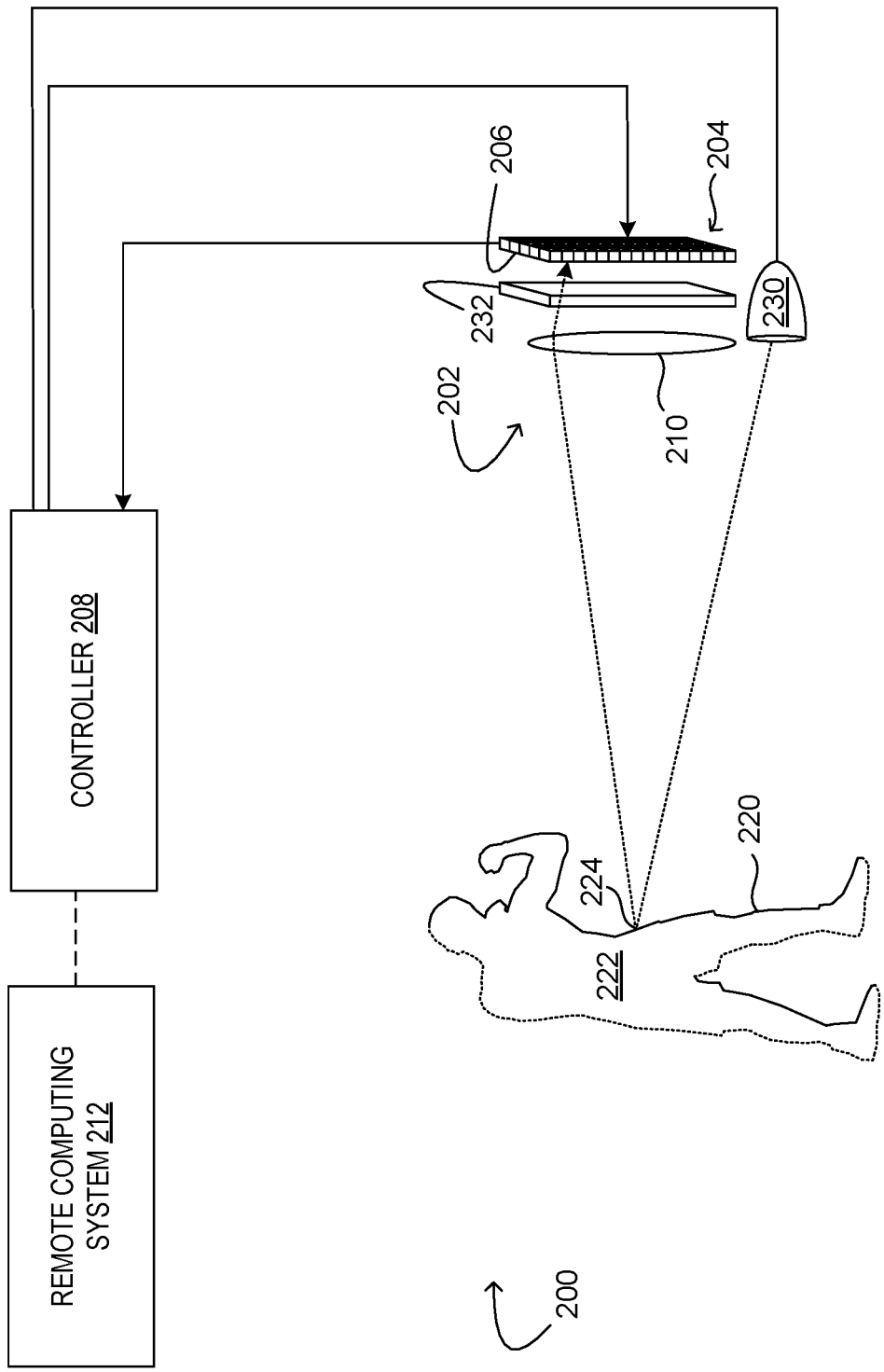
FIG. 2 shows aspects of an example ToF camera system.

FIG. 2 shows a schematic depiction of an example phase-based ToF depth imaging system 200 including a ToF camera 202. ToF camera 202 includes a sensor array 204 comprising a plurality of ToF pixels 206 each configured to acquire light samples that capture phase data, a controller 208, and an objective lens system 210. In some examples, objective lens system 210 may be omitted. Objective lens system 210 is configured to focus an image of at least one surface 220 of a subject 222 onto sensor array 204. Controller 208 is configured to gather and process data from ToF pixels 206 of sensor array 204 and thereby construct a depth image. Controller 208 may comprise executable instructions (e.g. software, firmware and/or hardware) to perform denoising and phase unwrapping, as described below. Controller 208 may be implemented across one or more computing devices. In some examples, controller 208 may communicate with a remote computing system 212 to perform depth image processing in accordance with the distributed depth image processing pipeline examples disclosed herein. Examples of hardware implementations of computing devices configured to perform phase unwrapping are described in more detail below with reference to FIG. 11.

Depth imaging system 200 also includes a modulated light emitter 230, and an analog and/or digitally modulated electronic shutter 232 for sensor array 204 to control the integration of light by the sensor array 204. Modulated light emitter 230 and sensor array 204 may be controlled via controller 208. Modulated light emitter 230 may be configured to emit electromagnetic radiation having any frequency detectable by ToF pixels 206. For example, modulated light emitter 230 may include an infrared (IR) light-emitting diode (LED), laser diode (LD), or any other suitable light source. The amplitude modulated light may be modulated at different frequencies sequentially or simultaneously, e.g., the modulation waveform may comprise a manifold of frequencies.

Sensor array 204 is configured to sample light from modulated light emitter 230 as reflected off surface 220 and back to the camera. Each ToF sensing pixel 206 of sensor array 204 may comprise one or more pixel taps operable to integrate the reflected light signal at different time intervals, from which the phase shift can be determined. Sensor array 204 is controlled, for each modulation frequency, to sample light at plural phase angles of the amplitude-modulated light from the light source, and determine a phase sample for each modulation frequency from the plurality of light samples for the modulation frequency. The phase samples can then be unwrapped to obtain a depth value for each pixel.

As mentioned above, due to the periodic nature of the modulated light, the measured total phase repeats (or wraps) every $2\pi$. For example, given a measured phase $\tilde{\phi}(k)$, the total phase is $\tilde{\phi}(k)+2\pi n(k)$, where $n(k)$, is an integer. Since $n(k)$ cannot be directly measured via a phase based ToF pixel, the total phase, and thus the actual distance related to the measurement, is ambiguous. Thus, in phase-based ToF imaging, there is a limitation on the distance that can be measured (referred to as the unambiguity range) imposed by the modulation frequency. Two or more different modulation frequencies can be used to increase the unambiguity range, and the collected phase shift data is then unwrapped for the accurate determination of distance.

Figure 3:
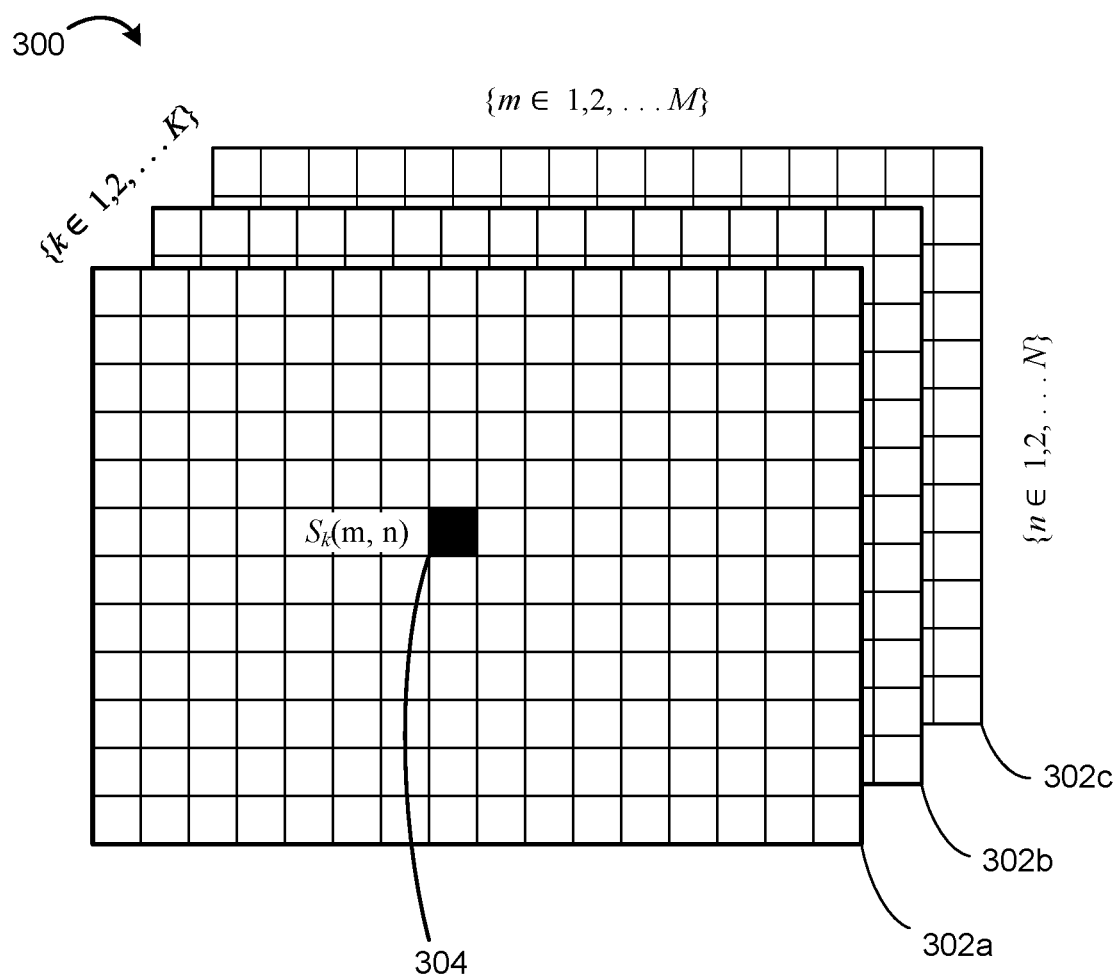
FIG. 3 schematically illustrates example ToF image data for a plurality K of modulation frequencies.

FIG. 3 schematically illustrates example ToF image data 300 for a plurality K of modulation frequencies. Data 300 represents data that can be acquired by depth imaging system 200 during multi-frequency frame collection. In the example shown, the depth data comprises a M×N array of data for each of K modulation frequencies, resulting in M×N grids 302a-c of data, wherein each pixel 304 in each grid represents a measurement acquired at a corresponding illumination light modulation frequency k of K modulation frequencies. For example, the experimental signal $\tilde{S}$ collected by pixel 304 at (m, n), for the modulation frequency k is represented by $$\tilde{S}(m,n,k) = \widetilde{AB}(m,n,k) e^{i\tilde{\phi}(m,n,k)}$$

where $\tilde{\phi}(k)$ is the phase, $\{m \in 1, 2, \ldots, M\}$, $\{n \in 1, 2, \ldots, N\}$, and $\{k \in 1, 2, \ldots, K\}$. A tilde accent over a variable indicates that the variable is obtained and/or calculated experimentally, while the absence of a tilde accent indicates variables that correspond to a noise-free situation. An average active brightness (AB) for the pixel can be calculated from the signal $\tilde{S}$. Furthermore, temporal active brightness data $AB_k$ can be obtained by considering each frequency k separately, i.e., from the different $\tilde{S}_k$ signals. Unless otherwise stated, as used herein, "temporal active brightness data" refers to active brightness data collected for a plurality of modulation frequencies to form a depth image. While the example depicted in FIG. 3 shows three grids 302a-c, any number of frequencies $K \geq 2$ can be used.

The phase of the complex signal $\tilde{\phi}(k)$ may be computed as $$\tilde{\phi}(k) = \arctan 2(\tilde{S}_i(k), \tilde{S}_r(k))$$

where $\tilde{S}_i(k)$ is the imaginary part of the signal collected for frequency k and $\tilde{S}_r(k)$ is the real part of the signal collected. The measured phase is used to compute the depth value associated with the pixel. However, as mentioned above, in phase-based ToF imaging, there is a limitation on the distance that can be measured (referred to as the unambiguity range) imposed by the modulation frequency. Accordingly, a set of $K \geq 2$ modulation frequencies k can be used to increase the range of unambiguity, allowing the phase information to be unwrapped for the accurate determination of distance. Phase unwrapping is a way to disambiguate the phase shift data and identify a correct distance value by illuminating the scene with amplitude-modulated light of a plurality of different frequencies, as the distance ambiguities are different for each frequency of illumination light. For example, in a multifrequency method, the amplitude modulated light may comprise a waveform comprising a plurality of frequencies $\vec{f} = \{f_1, f_2, \ldots f_K\}$. The collection of frequencies comprises frequencies that are chosen to wrap at different locations in the unambiguity range, which extends from distance zero to a point where all three frequencies wrap at a common distance.

Figure 4A:
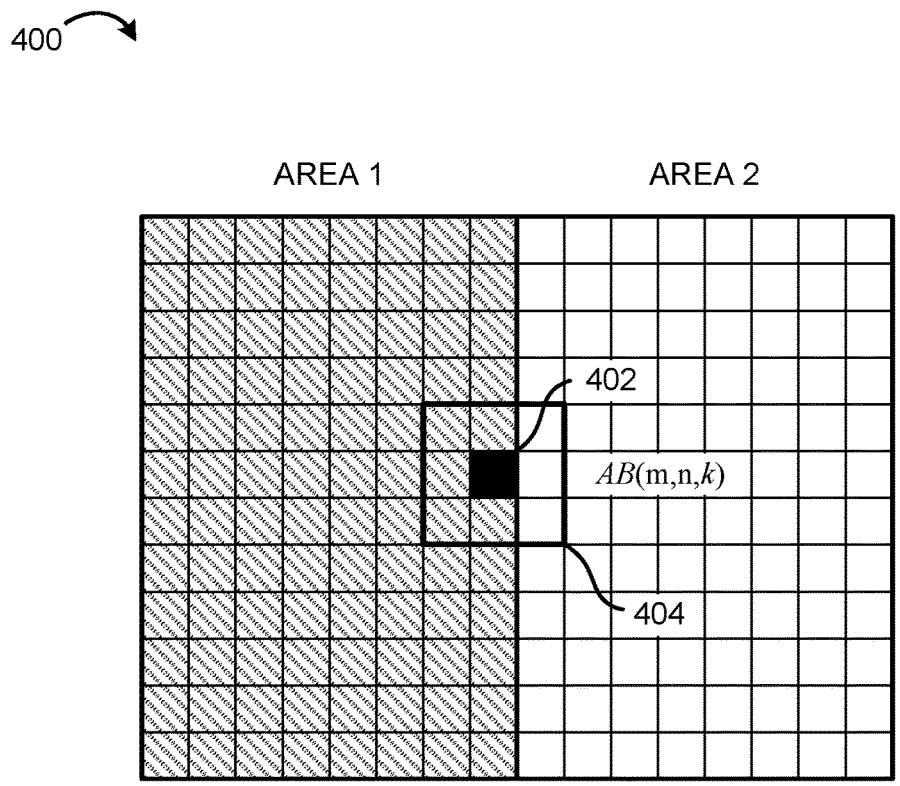
FIGS. 4A-4B schematically shows an example of signal contamination via diffusion for a pixel at an edge region.

As discussed above, multifrequency frame collection may obtain a signal affected by crosstalk and/or multipath interference. FIG. 4A shows example ToF image data 400 where signal diffusion causes signal contamination in a ToF pixel 402. Signal diffusion may be due to electrical and/or optical diffusion, and is also sometimes referred to as "crosstalk". ToF image data 400 represents data for a single amplitude modulation frequency k. ToF pixel 402 is located near the border between two regions: Area 1 (hatched lines) and Area 2. Thus, ToF pixel 402 is located in an "edge" region. Signal collected at ToF 402 may be contaminated by crosstalk from pixels in neighborhood 404.

Figure 4B:
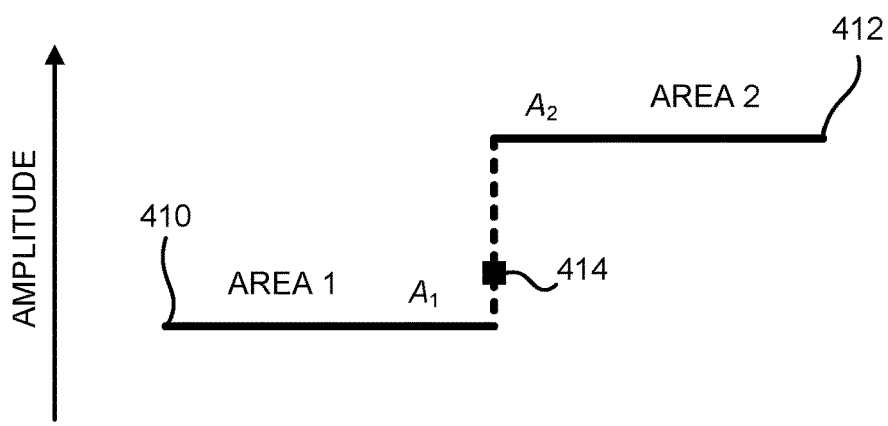

Area 1 and Area 2 may have different amounts of signal (i.e., different active brightness amplitude) as shown in FIG. 4B. Crosstalk may occur when two areas with different amounts of signal are adjacent. The effect may produce a warping in the active brightness and phase which is translated as a warping in the evaluated depth. This may reduce signal to noise ratio and reduce the probability of unwrapping correctly. As shown in FIG. 4B, Area 1 has a first, lesser active brightness level 410 while Area 2 has a second, greater active brightness level 412. As a result, the active brightness for pixel 402 may be at 414, intermediate between the levels of the two regions.

In general, the signal $S_e$ of a pixel affected by crosstalk may be expressed as $$S_e(m,n,k) = A(m,n,k)e^{i\phi(m,n,k)} + \sum_{i,j} \xi(i,j) A(i,j,k) e^{i\phi(i,j,k)} =$$

$$A(m,n,k)e^{i\phi(m,n,k)} + A_d(m,n,k)e^{i\phi_d(m,n,k)}$$

where A is the amplitude of the signal corresponding to the pixel location (m,n) and frequency k, φ is the phase of the pixel, ξ is the coefficient of diffusion, and (i,j) represents the location of a neighboring pixel. The diffusion coefficient may be pixel structure-dependent, e.g., diffusion characteristics may be different for vertical and horizontal pixel directions. As shown in the above equation, the effect of signal diffusion can also be expressed with $A_d$, which is the amplitude of the diffusion signal, and $\phi_d$, which is the phase of the diffusion signal.

When the active brightness is evaluated, an interference relationship may be observed as $$AB_e^2(m,n,k) = \|S_e(m,n,k)\|^2 = A^2 + A_d^2 + 2AA_d \cos[\phi(m,n,k) - \phi_d(m,n,k)]$$

where AB is the active brightness of the pixel, and d denotes a quantity which results from signal diffusion. The variation in active brightness across different frequencies is used as a statistical metric in various examples described herein. Suitable statistical metrics include the coefficient of variation and the index of dispersion, as described below.

As discussed above, multipath interference is a type of signal contamination where a ToF pixel receives light corresponding to active illumination light that is scattered by objects in the scene. For example, in a first light path, light emitted by the depth camera can reflect off a first surface back towards the depth image sensor. However, light can reflect off a different surface towards the first surface, and then reflect from the first surface towards the ToF sensor. As such, the first light path produces an intended signal and the second light path contaminates the intended signal. Multipath interference is an issue for active illumination ToF imaging, but may be more prevalent in some environments such as those with concave geometries, for example the corners of a room.

In the case of multipath interference, the signal S can be expressed as the sum of two complex planar waves:

$$S(k) = A_d e^{i\phi_d(k)} + A_g e^{i\phi_g(k)}$$

where the subscript d represents a direct path (i.e., the intended reflection path) and the subscript g represents a global path (i.e., light coming from another source via one or more indirect pathways). When active brightness is evaluated, an interference relationship is observed as $$AB^2(k) = \|S(k)\|^2 = A_d^2 + A_g^2 + 2A_d A_g \cos[(\phi_d(k) - \phi_g(k)]$$

where $AB^2(k)$ is the square of the active brightness at a frequency k.

A statistical metric can be determined based on the active brightness data and then used in various data processing operations. For example, the coefficient of variation (CoV) in active brightness may be determined using $$CoV(m,n) = \frac{\sigma_S(m,n)}{\overline{AB^\alpha}(m,n)}$$

where $\sigma_S(m, n)$ is the temporal standard deviation and $\overline{AB^\alpha}(m, n)$ is the average active brightness for pixel (m, n). Here, the temporal standard deviation is the standard deviation of the active brightness for different frequencies k. The parameter α may be set to 1 or 2, for example, to utilize active brightness AB or active brightness squared $AB^2$, respectively. The CoV metric is a scale-invariant metric. In another example, the index of dispersion (IoD) is determined using $$IoD(m,n) = \frac{\sigma_S^2(m,n)}{\overline{AB^\alpha}(m,n)}$$

where $\sigma_S^2$ is the temporal variance. The IoD metric is a scale-variant metric.

Variations of these statistical metrics may be used, such as $CoV^2$, $IoD^2$, or other suitable algebraic functions. Such functions may help avoid transcendental functions (e.g., square roots), which may have relatively higher computing burdens. In still further examples, any other suitable statistical metric may be used. Furthermore, as CoV is scale-invariant (for AB or $AB^2$), the metric may provide robust performance in a variety of different ambient lighting conditions.

The statistical metric may produce a relatively large variation for pixels that are affected by crosstalk and/or multipath interference. For example, if the CoV is utilized for determining crosstalk, a variation is expected as $$CoV(AB^2(m,n)) = \frac{\sqrt{\sum_k \left[AB^2(m,n,k) - \overline{AB^2}(m,n)\right]^2}}{(k-1)\overline{AB^2}(m,n)}$$

where k is the number of frequencies, k≥2. Likewise, if $CoV(AB^2)$ is considered for multipath interference, a variation is also expected as:

$$CoV(AB^2) = \frac{\sqrt{\sum_k \left[AB^2(k) - \overline{AB^2}\right]^2}}{(k-1)\overline{AB^2}}$$

where k is the number of frequencies, k≥2.

Figure 5:
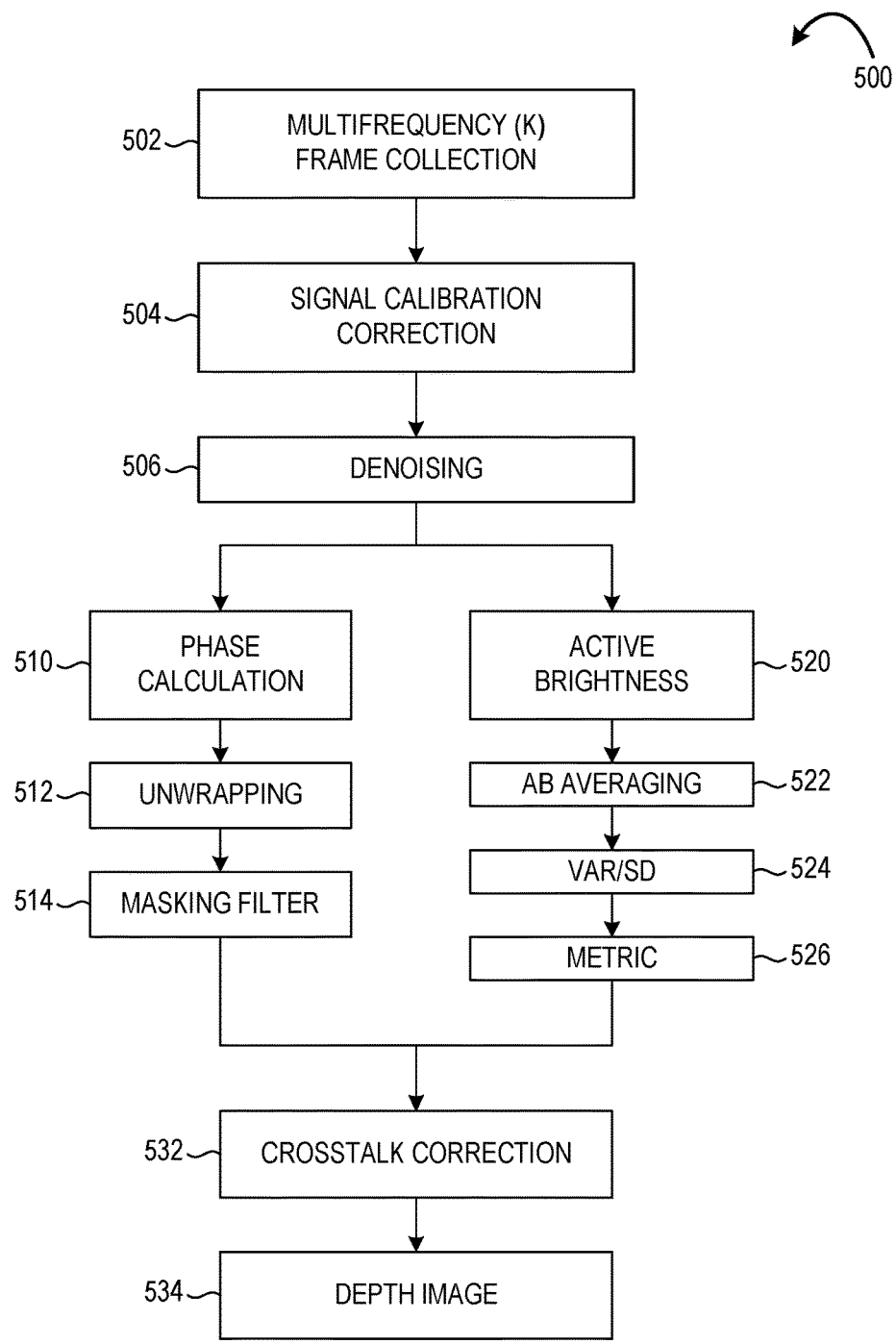
FIG. 5 shows an example method for processing depth data that includes determining a statistical metric based on temporal data.

FIG. 5 shows an example method 500 for processing depth data using a statistical metric. Method 500 may be implemented on a computing system that receives data from a depth camera. In some examples, method 500 may be implemented on a computing device incorporating the depth camera (e.g., an embedded depth engine pipeline). At 502, the method comprises performing multifrequency frame collection, where a plurality of phase samples (each comprising a frame of image data) is collected via a ToF image sensor for each of a plurality of amplitude modulation frequencies. At 504, signal calibration correction is performed to obtain phase data and temporal active brightness data. At 506, denoising is performed on one or more of the phase data and active brightness data. Denoising phase data prior to phase unwrapping may help avoid unwrapping errors.

Method 500 further comprises performing phase calculations at 510 and phase unwrapping at 512 to obtain depth image data. At 514, the method comprises applying one or more masking filters to the depth image data. Masking filters are threshold parameters that can be applied, for example, to remove poorly conditioned points, such as low Active Brightness pixels that produce pixels, low confidence pixels, and/or pixels that are not actively illuminated by the illumination source of the depth camera.

Temporal active brightness data 520 is processed via active brightness averaging at 522. At 524, method 500 comprises computing the temporal variance and/or temporal standard deviation in the temporal active brightness data, as described above. In some examples, a spatial filter is applied to the temporal active brightness data, and a temporal statistical metric is determined at 526. The temporal statistical metric may comprise any suitable metric. Examples include a coefficient of variation, a squared coefficient of variation, an index of dispersion, and/or a squared index of dispersion, as described above. In some examples, the statistical metric is calculated from the active brightness (AB) data. In other examples, the statistical metric is calculated using $AB^2$. In either case of AB or $AB^2$, the temporal active brightness data comprises data for each of the k frequencies.

Method 500 further comprises, at 532, performing a crosstalk correction based on the statistical metric. In some examples, a threshold value is used to identify target pixels that are likely affected by crosstalk and/or multipath interference. A comparison of the statistical metric to a threshold value may be performed in order to segment the pixels into groups. Image segmentation may be performed using one or more threshold values, followed by crosstalk correction on a segmented region.

A suitable threshold value may depend on the statistical metric used. For example, the CoV statistical metric for AB or $AB^2$ discussed above may range between 0 and 1. In contrast, the IoD metric for AB may range from 0 to 2 while the IoD metric for $AB^2$ ranges from 0 to 200. One experiment employing the CoV metric found good performance when setting the threshold to 0.33 when using and AB data, and setting the threshold to 0.45 when using $AB^2$ data. Furthermore, the threshold value may be dependent on the optional use of spatial filtering. For example, when employing the IoD metric for AB with spatial filtering, an experiment found good performance with a threshold of 0.51. However, when spatial filtering was not used, the threshold was set to 0.60. Similarly, when employing the IoD metric for $AB^2$, the threshold may be set to 51 in the case of spatial filtering, or set to 60 in the absence of spatial filtering. In other examples, any other suitable threshold can be used. Note that a scale invariant temporal metric, such as the coefficient of variation, may be insensitive to the use of spatial filters, as using a spatial filter with CoV for AB or $AB^2$ may simply affect the amount of signal below the threshold. In other examples, any other suitable thresholds may be used.

Relatively high variance may indicate edges and/or low signal to noise ratio. Thus, in some examples, an additional threshold value is used to distinguish edges. For example, a threshold based on the average of the square of active brightness (e.g., $\overline{AB^2}<25$) can be used to distinguish edge variability from low signal to noise ratio. As such, the statistical metric provides a way to detect edges (for edge enhancement operation) using pixelwise temporal domain data. Thus, edge detection may be accomplished while avoiding use of spatial filters, which may be more compute intensive.

The statistical metric can be used to perform various operations, such as a segmentation operation and/or denoising operation. A denoising operation may comprise applying a crosstalk correction (e.g., at 530), an edge enhancement filter, a spatial filter, and/or a smoothing filter. In some examples, the image data is segmented based on the statistical metric determined at 526 and then denoising operations are performed on pixels in a segmented region. Further, the statistical metric may help identify and mitigate flying pixels, described in more detail below regarding FIG. 9.

Continuing with method 500, after crosstalk correction and possibly other denoising operations, a depth image is output at 534. In some examples, the depth image is output together with the active brightness image. The depth and active brightness images may be output, for example, to applications executed on a remote computing system, to a device incorporating the ToF camera, and/or to a cloud computing system.

As processing depth image data may be computationally intensive, a distributed architecture may be utilized to move heavy compute from a low power depth camera device, which may be located on a battery-powered mobile device in some examples, to a remote computing system with more power. While a distributed depth engine may move heavy compute to a remote system, transmitting phase data for the individual modulation frequencies may consume significant bandwidth due to the quantity of data transferred per frame (e.g. two images (active brightness image and phase image) for each modulation frequency) and a frame rate of the camera. Thus, a distributed depth engine pipeline may be used in which coarse depth data is computed at a depth camera device and transmitted to a remote machine for signal conditioning (including denoising) using more compute-intensive convolutional spatial and/or temporal filtering processes. Processing depth sensor data over a distributed computing architecture may allow for reduced power consumption on the depth camera, while also allowing use of larger denoising kernels on a more powerful remote system.

Figure 6:
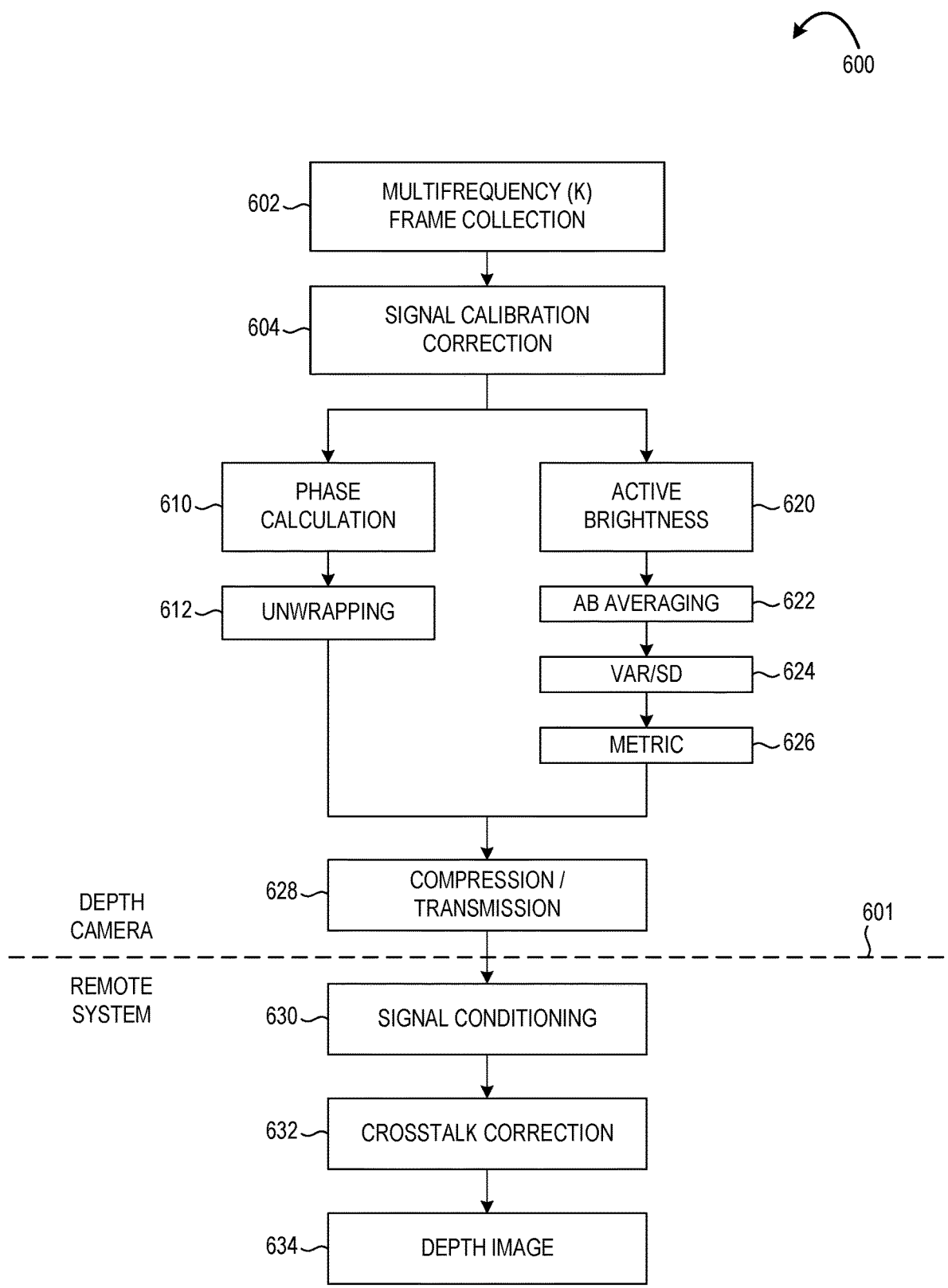
FIG. 6 shows an example distributed depth engine pipeline for processing depth data that includes determining a statistical metric based on temporal data.

FIG. 6 shows an example method 600 for processing depth data on a distributed depth engine pipeline using a statistical metric. In this example, the procedures above dashed line 601 are performed within the ToF camera and/or within the depth camera device, while procedures below the line are performed by processing remote to the depth camera (e.g., remote computing system, cloud computing system). At 602, the method comprises acquiring phase data and active brightness data via multifrequency frame collection. At 604, signal calibration correction is performed to obtain phase data and temporal active brightness data.

Method 600 further comprises performing phase calculations at 610 and phase unwrapping at 612 to obtain coarse depth image data. Active brightness data 620 is processed via active brightness averaging at 622. Then, at 624 the method comprises computing temporal variance and/or temporal standard deviation in the AB data. At 626, a statistical metric is determined, which may be any suitable metric such as those described above. The statistical metric can be transmitted to the remote computing system for use in performing various operations such as segmentation and/or denoising, and may include applying a crosstalk correction, an edge enhancement filter, a spatial filter, and/or a smoothing filter. In some examples, the statistical metric is used to segment the image data such that pixels in a first segmented region are processed locally on the depth camera device while pixels in a second segmented region are transmitted to the remote computing system for further processing.

Method 600 further comprises, at 628, transmitting the coarse depth image data and one or more of active brightness data, statistical metric data, and segmentation information to a remote computing device for processing. For example, transmitting active brightness data may allow the remote computing system to reconstruct phase data and/or output a final active brightness image. In further examples, the depth camera device may segment the depth image based on the metric and transmit depth image data and segmentation information. The depth image data may include pixels in a segmented region and not include pixels from other segmented regions. Further, segmentation information may comprise data that indicates a region classification (e.g., high signal, low signal, edge region), an area of a segmented region, and/or a type of denoising operation to be performed. In still further examples, statistical metric data is transmitted at 628, which may allow the remote computing system to perform any suitable operation based on the metric (e.g., segmentation, denoising, flying pixel detection).

In some examples, phase data can be reconstructed from the coarse depth image data, and the reconstructed phase data can undergo conditioning. For example, M×N×k phase data can be reconstructed from a coarse M×N depth image by $$\tilde{S}(m,n,k) = \tilde{S}_r(m,n,k) + i\tilde{S}_i(m,n,k) = \widetilde{AB}(m,n)e^{i\tilde{\phi}(m,n,k)}$$

where $\tilde{S}$ is the reconstructed signal, $\tilde{S}_r$ and $\tilde{S}_i$ are the real and imaginary parts of the signal, $\widetilde{AB}$ is the active brightness transmitted by the device, and $\tilde{\phi}$ is the phase. Here, the tilde accent indicates a noisy signal or noisy value. The phase may be determined from the coarse depth by $$\tilde{\phi}(m, n, k) = \frac{4\pi \tilde{d}(m, n) f(k)}{c}$$

where $\tilde{d}$ is the depth and f(k) is a frequency of K total frequencies. In some examples, the frequencies used in reconstruction are based on the frequencies used during frame collection. In other examples, the frequencies used in reconstruction are different from the frequencies used by the camera during frame collection. For example, a set of virtual frequencies can be introduced and used to reconstruct phase data using the above equations. Further, any suitable plurality K of frequencies may be used. Different frequencies and/or a different number of frequencies may be chosen to produce a more noise resilient solution by maximizing the area, volume, or hypervolume of the Voronoi cell determined by the frequencies.

Method 600 further comprises performing signal conditioning at 630. Signal conditioning may include various denoising operations applied based on the statistical metric data and/or segmentation data received at 628. Signal conditioning may also include flying pixel detection based on the statistical metric. As discussed above, image segmentation may be based on a comparison of the statistical metric to one or more threshold values. Furthermore, signal conditioning may comprise depth domain processing, complex domain processing, or a combination of depth and complex domain processing. For example, the statistical metric may be used to segment the image data into high-signal regions, edge regions, and low-signal regions. Then, jitter reduction operations may be performed on depth domain data of high-signal pixels while denoising operations are performed on complex domain data of low-signal pixels. Likewise, edge enhancement operations may be performed on pixels in edge regions.

Method 600 further comprises crosstalk correction at 632. As discussed above, the statistical metric is used to identify pixels likely to be affected by crosstalk contamination or signal diffusion (e.g., temporal variance or temporal standard deviation above a threshold value). Flying pixels can also be mitigated at crosstalk correction 632. As such, crosstalk corrections are selectively applied to pixels based on the statistical metric. In some examples, the threshold value(s) used to segment the image data for signal conditioning at 630 are also used for crosstalk correction at 632. In other examples, different threshold values are used for segmentation and crosstalk correction.

Method 600 further comprises outputting the depth image at 634. The final depth image may be output to applications or user services on the remote computing device, on the cloud, or on the computing device incorporating the ToF image sensor.

Figure 7:
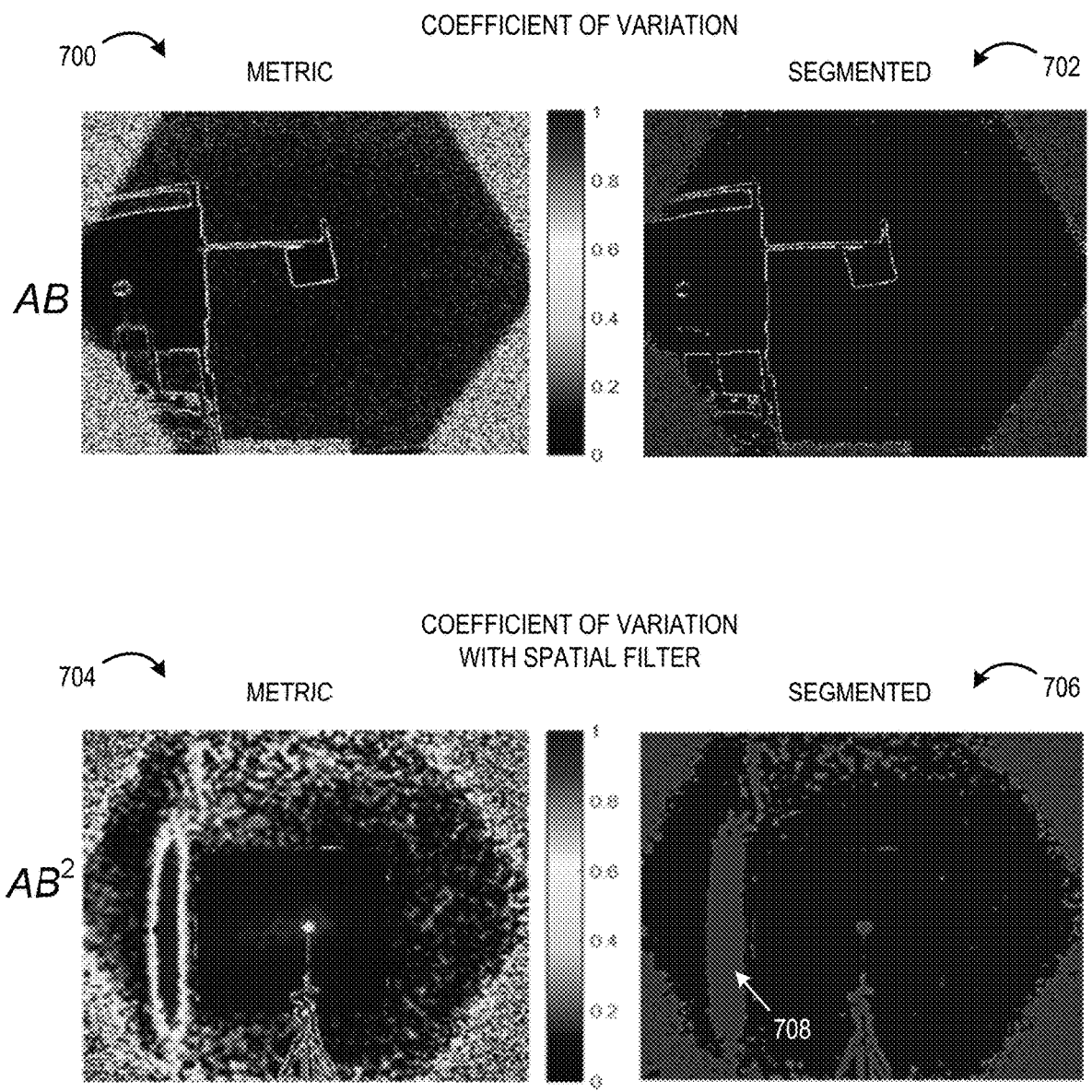
FIG. 7 show example segmentation of a depth image using a metric based on a temporal standard deviation of active brightness data.

FIG. 7 shows example images that have been processed using a coefficient of variation as the pixelwise temporal metric. Image 700 shows a first scene where the coefficient of variation metric was applied to AB data. Relatively higher variance is observed in the edge regions. Image 702 shows the result of image 700 after segmentation using a threshold value of 0.33. Spatial filtering was not employed in the processing of images 700 and 702.

Images 704 and 706 show depth data processing of a second scene that comprises two surfaces positioned in a way to induce multipath interference. Images 704 and 706 were processed using a spatial filter. Image 704 shows the coefficient of variation metric applied to $AB^2$ data. Image 706 shows the result of image 704 after segmentation using a threshold value of 0.45. Relatively high variation is observed near the corners of the images, and also on one of the two surfaces (as indicated by region 708) where multipath interference is expected.

Figure 8:
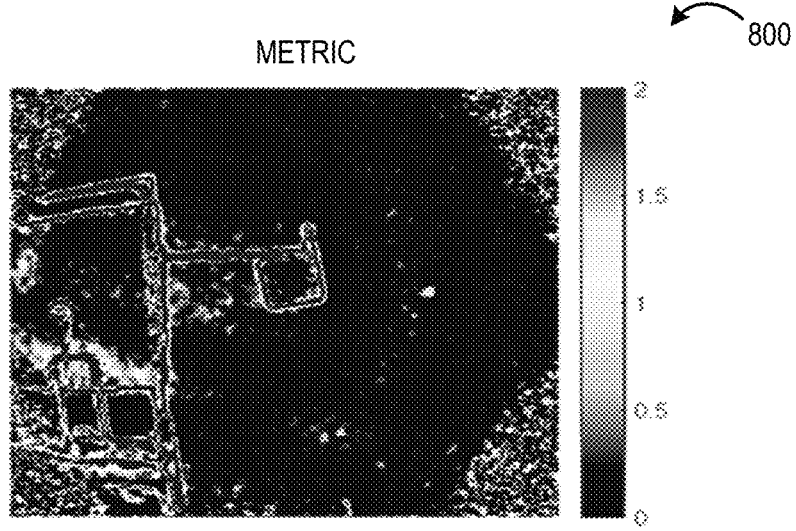
FIG. 8 show example segmentation of a depth image using a metric based on temporal variance of active brightness data.
Figure 8:
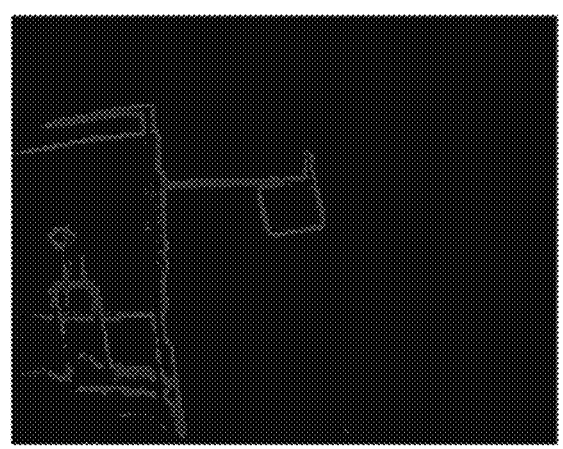

FIG. 8 shows example images that have been processed using the index of dispersion as a metric and using spatial filtering. Image 800 shows the result of applying the IoD metric to the AB data. Image 802 shows the result of image 800 after segmentation using a threshold of 0.51. As seen in image 802, edges regions are clearly visible, likely due to signal diffusion near edges (sometimes referred to as "webbing" or "spider web" effect) which produces high variation in the temporal active brightness data. The combination of spatial filtering with an IoD metric may achieve relatively good performance for edge identification and edge enhancement operations.

In addition to segmentation, denoising, and other operations, a pixelwise temporal metric can also be used to help identify and mitigate flying pixels (pixels with inaccurate phase unwrappings). Mitigation may comprise correcting the flying pixel or invalidating the pixel, i.e., removing the pixel from the depth image prior to outputting the depth image.

Figure 9:
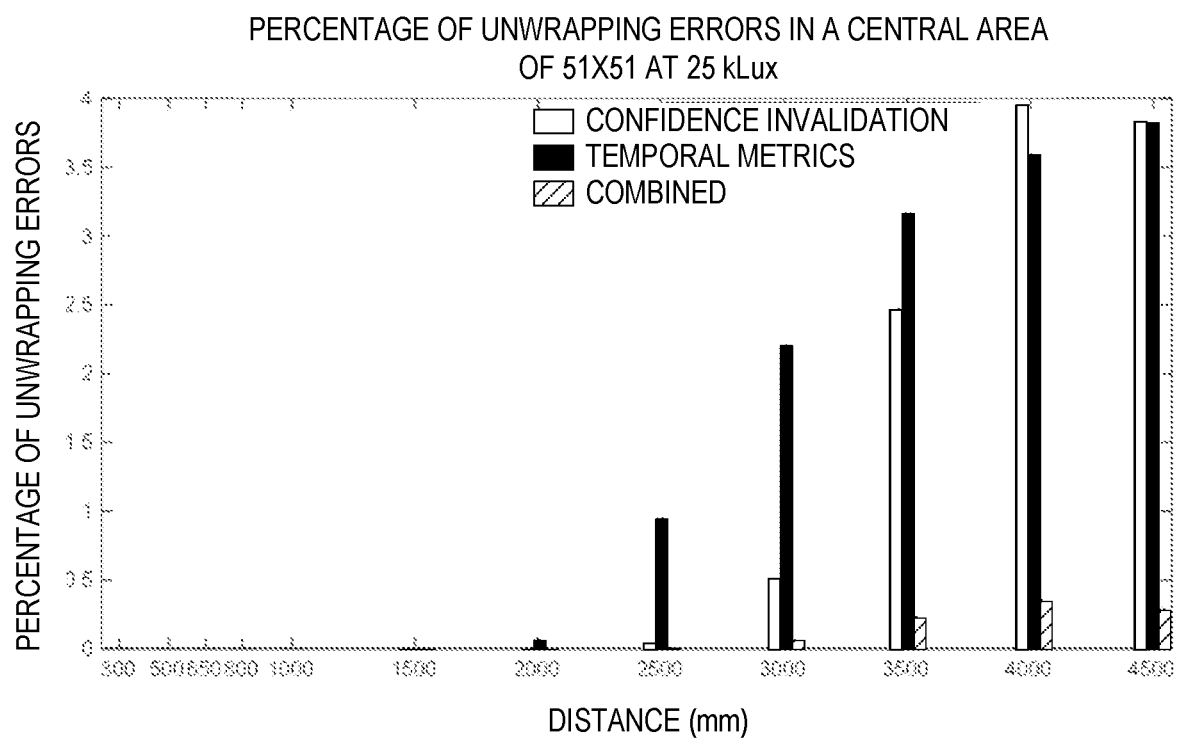
FIG. 9 shows a chart illustrating a percentage of unwrapping errors using different techniques to invalidate flying pixels, including a confidence filter, a temporal metric threshold, and a combination of the confidence filter and temporal metric threshold.

FIG. 9 shows a chart 900 showing the performance of various example approaches for flying pixel mitigation for a depth image obtained at an ambient brightness of 25 kLux. The data represents depth measurements of pixels within a 51×51 pixel region of an image. The x-axis shows the depth value of the pixel. Here, the "true" depth value of the pixel is the result of temporally averaging 100 frames (i.e., 10× signal to noise ratio). The data is binned based on the depth value of the pixel and the y-axis shows a percentage of unwrapping errors for pixels within each bin. An unwrapping is considered erroneous if the predicted depth differs from the "true" depth by ≤300 mm. As seen in chart 900, errors are more likely at greater depths. When using a confidence invalidation approach (e.g., when the unwrapped phase point lies outside the Voronoi cell in K-dimensional frequency space) the error rate may be 2.5-3.5% at depths of 3500-4500 mm. When using a threshold based on temporal metrics, the performance is similar. However, when using a combination of both a confidence filter and temporal metric thresholding, the error rate may be relatively low—below 0.5% in the depicted example. As such, using pixelwise temporal metrics may help achieve final depth images with fewer erroneous pixels.

Figure 10A:
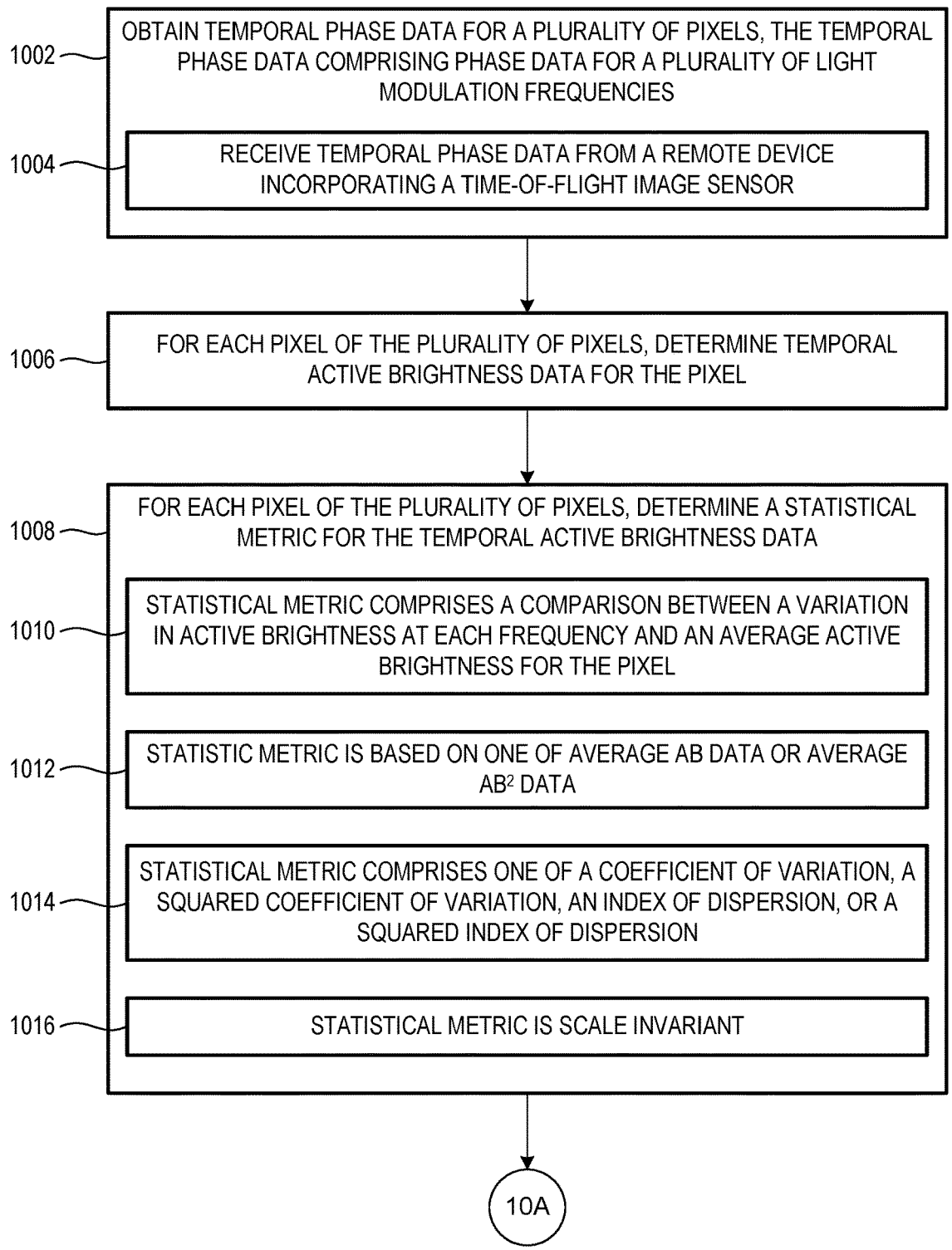
FIGS. 10A-10B show a flow diagram illustrating an example method for processing temporal phase data acquired from a time-of-flight camera.
Figure 10B:
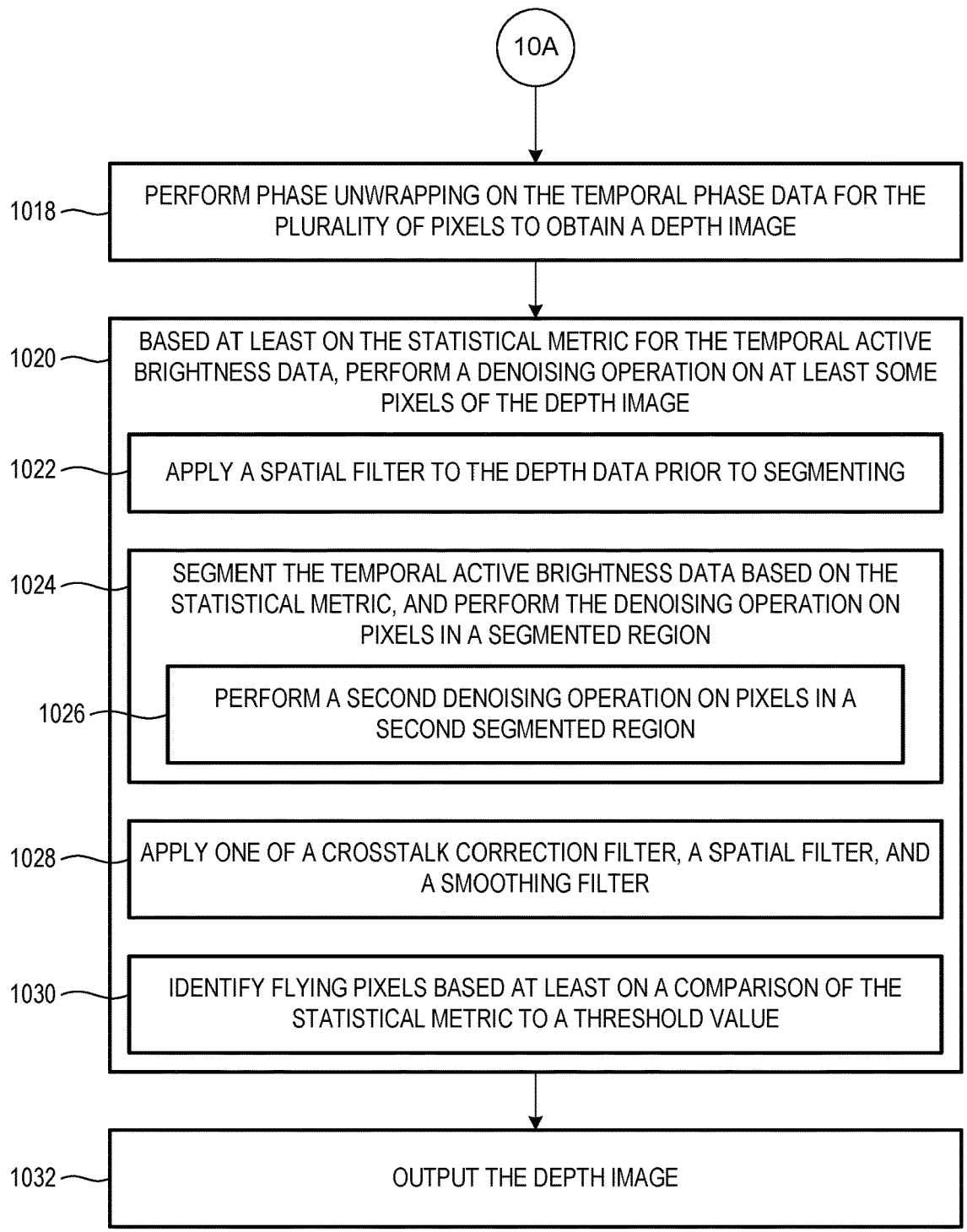

FIGS. 10A-10B show a flowchart illustrating an example method 1000 for processing temporal phase data acquired from a ToF camera. At 1002, the method comprises obtaining temporal phase data for a plurality of pixels, the temporal phase data comprising phase data for each pixel for a plurality of light modulation frequencies. The temporal phase data may be acquired by a ToF image sensor. In some examples, at 1004, the temporal phase data is received from a remote device incorporating the ToF image sensor.

Method 1000 further comprises, at 1006, for each pixel of the plurality of pixels, determining temporal active brightness data for the pixel. At 1008, the method comprises, for each pixel of the plurality of pixels, determining a statistical metric for the temporal active brightness data. In some examples, at 1010, the statistical metric comprises a comparison between a variation in active brightness at each frequency and an average active brightness for the pixel. In some examples, at 1012, the statistic metric is based on one of average AB data or average $AB^2$ data. In some examples, at 1014, the statistical metric comprises one of a coefficient of variation, a squared coefficient of variation, an index of dispersion, or a squared index of dispersion. In some examples, at 1016, the statistical metric is scale invariant. Examples of scale-invariant metrics include the CoV and $CoV^2$ metrics described above. In other examples, the statistical metric varies with scale. Examples of scale-variant metrics include the IoD and $IoD^2$ metrics described above.

Continuing to FIG. 10B, method 1000 further comprises, at 1018, performing phase unwrapping on the temporal phase data for the plurality of pixels to obtain a depth image. At 1020, the method further comprises, based at least on the statistical metric for the temporal active brightness data, performing a denoising operation on at least some pixels of the depth image. As discussed above, segmentation may be performed based on the statistical metric. In some examples, at 1022, the method comprises applying a spatial filter to the depth data prior to segmenting. In some examples, at 1024, method 1000 further comprises segmenting the temporal active brightness data based on the statistical metric, and performing the denoising operation on pixels in a segmented region. In some examples when segmentation is performed, the method further comprises, at 1026, performing a second denoising operation on pixels in a second segmented region, wherein the second denoising operation is different from the first denoising operation.

In some examples, at 1028, method 1000 further comprises applying one or more of a crosstalk correction filter, a spatial filter, and a smoothing filter. In some examples, at 1030, the method comprises identifying flying pixels based at least on a comparison of the statistical metric to a threshold value. In some examples, a confidence invalidation is also used to identify flying pixels. As discussed above, flying pixels may be corrected, if possible, or invalidated.

Method 1000 further comprises, at 1032, outputting the depth image. In some examples, the depth image is output to a remote computing system (e.g., cloud computing system, remote computing device, etc.). For example, the remote computing system may comprise a computing device incorporating the ToF camera from which the temporal phase data were acquired. In some examples, the depth image is output together with an active brightness image.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
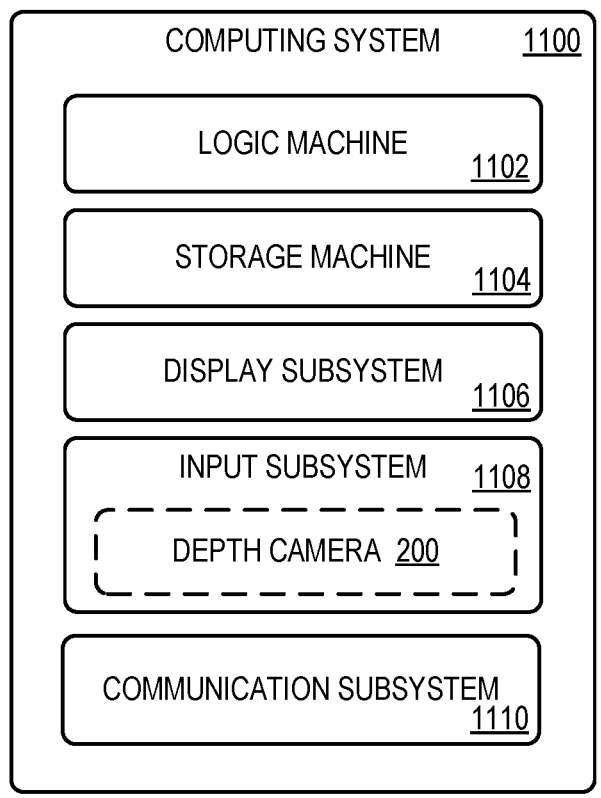
FIG. 11 shows a block diagram of an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. In some cases, a module, program, or engine may be instantiated via logic machine 1102 executing instructions held by storage machine 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera (e.g., depth camera 200) for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Another example provides a computing system comprising a logic machine, and a storage machine holding instructions executable by the logic machine to obtain temporal phase data for a plurality of pixels as acquired by a time-of-flight (ToF) image sensor, the temporal phase data comprising phase data for a plurality of light modulation frequencies, determine temporal active brightness data for the pixel, for each pixel of the plurality of pixels, determine a statistical metric for the temporal active brightness data, perform phase unwrapping on the temporal phase data for the plurality of pixels to obtain a depth image, based on the statistical metric for the temporal active brightness data, perform a denoising operation on at least some pixels of the depth image, and output the depth image. In some such examples, the statistical metric comprises one of a coefficient of variation, a squared coefficient of variation, an index of dispersion, or a squared index of dispersion. In some such examples, the denoising operation alternatively or additionally comprises one or more of a crosstalk correction, an edge enhancement filter, a spatial filter, and a smoothing filter. In some such examples, the instructions alternatively or additionally are further executable to segment the temporal active brightness data based on the statistical metric, and perform the denoising operations on pixels in a segmented region. In some such examples, the instructions alternatively or additionally are executable to apply a crosstalk correction to pixels in a segmented region determined to contain multipath signal contamination. In some such examples, the instructions alternatively or additionally are further executable to apply a spatial filter prior to segmenting the image. In some such examples, the instructions alternatively or additionally are executable to perform a first denoising operation on a first segmented region of pixels based on the statistical metric, and a second denoising operation on a second segmented region of pixels based on the statistical metric, wherein the second denoising operation is different than the first denoising operation. In some such examples, the statistical metric alternatively or additionally is scale-invariant. In some such examples, the instructions alternatively or additionally are executable to determine the statistical metric by applying an algebraic, non-transcendental function to the temporal active brightness data. In some such examples, the instructions executable to determine the statistical metric alternatively or additionally comprise instructions executable to perform pixelwise operations. In some such examples, the instructions alternatively or additionally are executable to receive temporal phase data from a remote computing device incorporating the ToF image sensor. In some such examples, the instructions alternatively or additionally are further executable to invalidate a pixel of the plurality of pixels based at least on a comparison of the statistical metric to a threshold value.

Another example provides a computing system comprising a logic machine, and a storage machine holding instructions executable by the logic machine to obtain temporal phase data for a plurality of pixels as acquired by a time-of-flight (ToF) image sensor, the temporal phase data comprising phase data for a plurality of light modulation frequencies, determine temporal active brightness data for the pixels, for each pixel of the plurality of pixels, determine a statistical metric for the temporal active brightness data, perform phase unwrapping on the temporal phase data to obtain a depth image, segment the depth image based on the statistical metric, apply a denoising filter to pixels of a segmented region, and output the depth image. In some such examples, the statistical metric comprises one or more of a temporal standard deviation of active brightness in proportion to a temporal average active brightness or a temporal variance of active brightness in proportion to a temporal average active brightness. In some such examples, the instructions alternatively or additionally are executable to segment the depth image into two or more segmented regions based on performing a comparison of the statistical metric to a threshold value. In some such examples, the instructions alternatively or additionally are executable to segment the depth image into a high signal region, a low signal region, and an edge region. In some such examples, the denoising filter alternatively or additionally comprises one or more of a crosstalk correction, an edge enhancement filter, a spatial filter, and a smoothing filter. In some such examples, the instructions alternatively or additionally are further executable to identify flying pixels based at least on a comparison of the statistical metric to a threshold value, and apply a denoising filter to pixels that have been identified as flying pixels.

Another example provides, enacted on a computing device, a method for processing temporal phase data acquired from a time-of-flight (ToF) camera, the method comprising obtaining temporal phase data for a plurality of pixels, the temporal phase data comprising phase data for a plurality of light modulation frequencies, for each pixel of the plurality of pixels, determining temporal active brightness data for the pixel, determining a statistical metric for the temporal active brightness data, performing phase unwrapping on the temporal phase data for the plurality of pixels to obtain a depth image, based at least on the statistical metric for the temporal active brightness data, performing a denoising operation on at least some pixels of the depth image, and outputting the depth image.

In some such examples, the method further comprises detecting edge regions based on the statistical metric, and applying an edge enhancement filter to pixels of edge regions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
 a logic machine; and
 a storage machine holding instructions executable by the logic machine to
  obtain temporal phase data for a plurality of pixels as acquired by a time-of-flight (ToF) image sensor, the temporal phase data comprising phase data for a plurality of light modulation frequencies acquired at different times;
  determine temporal active brightness data for the pixel,
  for each pixel of the plurality of pixels, determine a statistical metric for the temporal active brightness data for the pixel,
  perform phase unwrapping on the temporal phase data for the plurality of pixels to obtain a depth image,
  based on the statistical metric for the temporal active brightness data, perform a denoising operation on at least some pixels of the depth image, and
  output a denoised depth image.

2. The computing system of claim 1, wherein the statistical metric comprises one of a coefficient of variation, a squared coefficient of variation, an index of dispersion, or a squared index of dispersion.

3. The computing system of claim 1, wherein the denoising operation comprises one or more of a crosstalk correction, an edge enhancement filter, a spatial filter, and a smoothing filter.

4. The computing system of claim 1, wherein the instructions are further executable to segment the temporal active brightness data based on the statistical metric, and perform the denoising operations on pixels in a segmented region.

5. The computing system of claim 4, wherein the instructions are executable to apply a crosstalk correction to pixels in a segmented region determined to contain multipath signal contamination.

6. The computing system of claim 4, wherein the instructions are further executable to apply a spatial filter prior to segmenting the image.

7. The computing system of claim 4, wherein the instructions are executable to perform a first denoising operation on a first segmented region of pixels based on the statistical metric, and a second denoising operation on a second segmented region of pixels based on the statistical metric, wherein the second denoising operation is different than the first denoising operation.

8. The computing system of claim 1, wherein the statistical metric is scale-invariant.

9. The computing system of claim 1, wherein the instructions are executable to determine the statistical metric by applying an algebraic, non-transcendental function to the temporal active brightness data.

10. The computing system of claim 1, wherein the instructions executable to determine the statistical metric comprise instructions executable to perform pixelwise operations.

11. The computing system of claim 1, wherein the instructions are executable to receive temporal phase data from a remote computing device incorporating the ToF image sensor.

12. The computing system of claim 1, wherein the instructions are further executable to invalidate a pixel of the plurality of pixels based at least on a comparison of the statistical metric to a threshold value.

13. A computing system, comprising:
 a logic machine; and
 a storage machine holding instructions executable by the logic machine to
  obtain temporal phase data for a plurality of pixels as acquired by a time-of-flight (ToF) image sensor, the temporal phase data comprising phase data for a plurality of light modulation frequencies acquired at different times;
  determine temporal active brightness data for the pixels,
  for each pixel of the plurality of pixels, determine a statistical metric for the temporal active brightness data for the pixel, perform phase unwrapping on the temporal phase data to obtain a depth image, segment the depth image based on the statistical metric, apply a denoising filter to pixels of a segmented region, and output a denoised depth image.

14. The computing system of claim 13, wherein the statistical metric comprises one or more of a temporal standard deviation of active brightness in proportion to a temporal average active brightness or a temporal variance of active brightness in proportion to a temporal average active brightness.

15. The computing system of claim 13, wherein the instructions are executable to segment the depth image into two or more segmented regions based on performing a comparison of the statistical metric to a threshold value.

16. The computing system of claim 13, wherein the instructions are executable to segment the depth image into a high signal region, a low signal region, and an edge region.

17. The computing system of claim 13, wherein the denoising filter comprises one or more of a crosstalk correction, an edge enhancement filter, a spatial filter, and a smoothing filter.

18. The computing system of claim 13, wherein the instructions are further executable to identify flying pixels based at least on a comparison of the statistical metric to a threshold value, and apply a denoising filter to pixels that have been identified as flying pixels.

19. Enacted on a computing device, a method for processing temporal phase data acquired from a time-of-flight (ToF) camera, the method comprising:

obtaining temporal phase data for a plurality of pixels, the temporal phase data comprising phase data for a plurality of light modulation frequencies acquired at different times;

for each pixel of the plurality of pixels,
determining temporal active brightness data for the pixel, and
determining a statistical metric for the temporal active brightness data for the pixel, performing phase unwrapping on the temporal phase data for the plurality of pixels to obtain a depth image, based at least on the statistical metric for the temporal active brightness data, performing a denoising operation on at least some pixels of the depth image, and outputting a denoised depth image.

20. The method of claim 19, further comprising detecting edge regions based on the statistical metric, and applying an edge enhancement filter to pixels of edge regions.

* * * * *